(12) United States Patent
Oggioni et al.

(10) Patent No.: US 7,788,801 B2
(45) Date of Patent: Sep. 7, 2010

(54) METHOD FOR MANUFACTURING A TAMPER-PROOF CAP FOR AN ELECTRONIC MODULE

(75) Inventors: Stefano Sergio Oggioni, Milan (IT); Vincenzo Condorelli, Poughkeepsie, NY (US); Nihad Hadzic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 11/460,329

(22) Filed: Jul. 27, 2006

(65) Prior Publication Data

US 2007/0038865 A1 Feb. 15, 2007

(30) Foreign Application Priority Data

Jul. 27, 2005 (EP) .................................. 05106927

(51) Int. Cl.
*H01K 3/10* (2006.01)
*H04L 9/32* (2006.01)

(52) U.S. Cl. .............................. 29/852; 29/830; 29/831; 29/832; 29/856; 29/857; 713/178

(58) Field of Classification Search ................... 29/852, 29/739, 830, 831, 832, 856, 857, 858; 361/262, 361/266, 648, 657, 672; 174/262, 263, 265, 174/251, 252; 257/690, 691; 438/106; 173/178, 173/176

See application file for complete search history.

(56) References Cited

U.S. PATENT DOCUMENTS

| 4,851,615 | A | * | 7/1989 | Butt ........................... 174/250 |
| 5,406,630 | A | * | 4/1995 | Piosenka et al. ............... 380/52 |
| 6,324,067 | B1 | * | 11/2001 | Nishiyama .................. 361/761 |
| 2003/0150641 | A1 | * | 8/2003 | Kinayman et al. .......... 174/255 |

FOREIGN PATENT DOCUMENTS

EP 1045352 10/2000

OTHER PUBLICATIONS

"Security Requirements For Cryptographic Modules"—Published in the Federal Information Processing Standards Publication, 140-2 by the National Institute of Standards and Technology (NIST) Issued May 25, 2001.

* cited by examiner

*Primary Examiner*—Derris H Banks
*Assistant Examiner*—Tai Nguyen
(74) *Attorney, Agent, or Firm*—Joseph Petrokaitis (57) ABSTRACT

A tamper-proof cap adapted to be mounted on a large assembly for shielding a selected area of the large assembly is disclosed. The tamper-proof cap comprises a laminate stack-up structure wherein at least one open chamber is formed. The stack-up structure comprises at least two layers wherein tamper-proof layers are formed on top of the open chamber. A plurality of vias are disposed around the open chamber, forming with said tamper proof layers a tamper-proof structure around said open chamber. The vias are adapted for connecting the tamper-proof layers to the large assembly when the tamper-proof cap is mounted. In a preferred embodiment, the tamper-proof cap further comprises a shielding layer on top of the tamper-proof layer that are preferably done using conductive ink.

5 Claims, 8 Drawing Sheets

METHOD FOR MANUFACTURING A TAMPER-PROOF CAP FOR AN ELECTRONIC MODULE

FIELD OF THE INVENTION

The present invention relates generally to electronic packages and to secure electronic packages and more specifically to tamper-proof caps for large assembly.

BACKGROUND OF THE INVENTION

According to the Department of Commerce of the United States of America, all secure cryptographic application are classified according to one of four possible levels listed in the technical specification untitled "Security requirements for cryptographic modules" published in the Federal Information Processing Standards FIPS PUB 140-2 by the National Institute of Standards and Technology (NIST). This standard specifies the security requirements that must be satisfied by a cryptographic module to be utilized within a security system, protecting sensitive but unclassified information. The standard provides four increasing qualitative levels of security that are intended to cover a wide range of potential applications and environments in which cryptographic modules may be used.

Electronic packages to be used for FIPS certified applications have a very important function beyond the classical mechanical protection for the embedded semiconductor devices. They ultimately need to maintain the security of the cryptographic keys and algorithm stored within the module. One of the requirement of the highest level of security (FIPS 140 level 4) is the capability to detect and respond to physical intrusion attempts. Such security is provided, in particular, by using tamper proof layers avoiding the undetected penetration of microprobes that can be used to read information from outside of the secure boundaries of the electronic package.

Basically, tamper proof layers comprise a sequence of layers with a combination of different techniques and properties to allow detection by an electronic monitoring system of tamper attempts. When such event is sensed, a security system disables the module, clearing all sensitive information stored in a volatile memory within the electronic package. From the security point of view, the tamper attempts are detected when circuits change their electrical properties from a previous balanced and characterized level. These protection layers are capable of preventing the creation of holes, to introduce electrical microprobes, made by any kind of technique such as micro-drilling with ceramic drills or laser and selective layer ablation. They are also made difficult to work with, for example due to intrinsic material/layer fragility when tampered (very low thickness, brittle layers, not solderable) such as to prevent shunting of the electrical circuit.

To preserve and to extend the life of the battery back-ups, these circuits are preferably made of highly resistive conductive materials drawing low current versus the utilization of low ohmic conductive lines.

The engineering of these electronic packages can drive to solutions where several of the manufacturing steps can be updated to include features that, from the security point of view, are relevant in meeting specific antitampering needs.

The secure module definition i.e., the structure of the implemented layers, is taking advantage of the different possible combinations of stacking these layers for meeting the different levels of security for more generic commercial applications beyond the FIPS requirements.

For example, European Patent Application EP 1,045,352 discloses a tamper respondent enclosure comprising laminates configured with edge portions in overlapping relation and adhered to one another to define an enclosure. A cable passes between overlapping edge portions of the laminate to provide communication between the exterior and the interior of the enclosure. The cable comprises a plurality of signal carrying elements located and spaced laterally relative to one another by a carrier and defining apertures between the elements at a portion of the cable passing between the overlapping edge portions. An adhesive material extends through the apertures to adhere the overlapping portions to one another.

The tamper-proof systems as described above are efficient but are expensive and cumbersome to produce. For example, a current application consists of a Peripheral Component Interconnect (PCI) card placed into a pair of copper covers that are then riveted together and gift-wrapped with a polymer film that carries a pattern of carbon ink defining a resistive network on its two sides. Once the film is placed all around, the package is placed into an aluminum box, open on one side, and the whole assembly is then potted with a polyurethane resin. From the formed 'brick', only a flat cable is exiting to establish the electrical connection with the system's electronics.

False calls during the manufacturing operations and in the field show the limits of the current solution. The erasing of the cryptographic code causes the replacement of units at customer's sites. Furthermore, such solution presents several drawbacks such as:

Bowing, that has been identified as one of the effects responsible for false tamper calls. There are a few mechanisms that can trigger the bowing of the secure package that at the end tears, breaks or rips the resistive carbon traces off from their flexible support. A) The resin potting of the wrapped and the riveted covers, containing the card, creates a multi-materials combination with mutually induced effects on their own different physical properties, such as the coefficient of thermal expansion (CTE), Young's or elastic module, Poisson's ratio and other physical properties. As with all electronic products the functioning of the electronics will generate heat and consequently materials expansion that consequently will start applying various kind of stress to the package. One of higher concern is localized bowing that causes elongation and eventually failure of the highly resistive tracks of the secure mesh triggering a tamper-sensing. B) the same mechanism of point (A) gets worsened with the possible presence of moisture. As all the plastic electronic packages using plastic polymer sealing that is not moisture proof, moisture is absorbed by the polymer in time, and gets desorbed with thermal cycles. Desorbtion is increasing the availability of water within constrained air pockets. Rapid thermal cycle may generate steam, creating condition for sudden and localized formation of high pressure steam, this is also known as "Pop corn" effect, i.e. inside air bubbles within the potting polymer, that trigger localized pressure/expansion of the material. C) Along the same line of physics laws another interesting effect is in the shipping procedures with transits or legs of journey in a low pressure environment, like an airplane cargo where the outside depressurized environment poses a challenge in the shipping procedures.

The polymer film with exposed resistive traces show limits during handling and the gift-wrapping of the box. The resulting lines abrasion breaks the resistive network.

The resistive matrix folded around the box is using an electrically conductive isotropic adhesive that shows temperature dependencies and batch to batch performance changes.

Thus, there is a need for a secure module that remedies the shortcomings of the prior art.

SUMMARY OF THE INVENTION

Thus, it is a broad object of the invention to remedy the shortcomings of the prior art as described here above.

It is another object of the invention to provide tamper-proof layers and caps within Printed Circuit Board (PCB) substrate for secure cryptographic applications.

It is a further object of the invention to provide a method of building tamper-proof layers and caps within PCB substrate for secure cryptographic applications.

It is still a further object of the invention to provide a simple and cost-effective method of building tamper-proof layers and caps within PCB substrate for secure cryptographic applications.

The accomplishment of these and other related objects is achieved by a tamper-proof cap adapted to be mounted on a large assembly for shielding a selected area of said large assembly.

According to a first aspect of the invention, a tamper-proof cap for an electronic module is provided, said tamper-proof cap comprising:

a tamper-proof layer comprising a plurality of conductive layers; and a plurality of conductive vias electrically connected to said plurality of conductive tracks, said plurality of vias being adapted for connecting said tamper-proof cap to a circuit board, wherein said tamper-proof cap is configured so that an open chamber is formed when said tamper-proof cap is mounted on the circuit board and said plurality of conductive vias are disposed around said open chamber.

According to yet another aspect of the invention, a tamper-proof cap comprises a laminate stack-up structure wherein at least one open chamber is formed, said stack-up structure comprising at least two layers wherein tamper-proof layers are formed on top of said open chamber, and a plurality of vias disposed around said open chamber, forming with said tamper proof layers a tamper-proof structure around said open chamber, said vias being adapted for connecting said tamper-proof layers to the large assembly when the tamper-proof cap is mounted, by a large assembly on which a tamper-proof cap as described above is soldered using Ball Grid Array (BGA) or micro-BGA.

According to yet another aspect of the invention, a method is provided for manufacturing a tamper-proof cap from a printed circuit board, said tamper-proof cap being adapted to be mounted on a large assembly for shielding a selected area of said large assembly, said method comprising the steps of:

forming a plurality of conductive tracks in at least two stacked conductive layers on a first side of said printed circuit board, said at least two conductive layers being insulated each other with dielectric material;

forming conductive holes in said printed circuit board for providing electrical connection to said plurality of conductive tracks from the second side of said printed circuit board layers stack, said conductive holes and said plurality of conductive tracks forming a security shield;

forming a cavity in said tamper proof cap, in said second side of said printed circuit board, said cavity being surrounded by said conductive tracks and said conductive holes forming a tamper-proof structure adapted to secure electronic devices enclosed in said cavity; and forming metal pads connected to said conductive holes, adapted to connect the cap to a main printed circuit board or substrate with components to be secured, said conductive pads being on the surface of the cap or embedded into one of the layers of the cap.

Further advantages of the present invention will become apparent to the ones skilled in the art upon examination of the drawings and detailed description. It is intended that any additional advantages be incorporated herein.

DESCRIPTION OF THE DRAWINGS

FIG. 1, comprising

FIG. 2, comprising

FIG. 3, comprising

FIG. 4, comprising FIGS. 4a to 4f, illustrates the main steps for the manufacturing of tamper-proof caps.

FIG. 6, comprising FIGS. 6a to 6m, illustrates the main steps of the algorithm depicted on FIG. 5.

DETAILED DESCRIPTION OF THE PREFERRED EMBODIMENT

According to the invention tamper-proof caps are used to cover the parts of a Printed Circuit Board (PCB) that need to be protected. In the simplest case, a single cap is used to protect the whole part of the PCB that must be protected. In other cases, several caps can be used, possibly on each side of the PCB. In a further embodiment, passive or active electronic devices can be embedded within the tamper-proof caps. The multi-cap solution offers relief from the thermal point of view splitting, under different caps, the different high dissipation comps. In the same time with different sizes caps there is the possibility to expand and or change the components used in the application allowing upgrades in performance and functions.

Tamper-Proof Caps

Figure 1A:
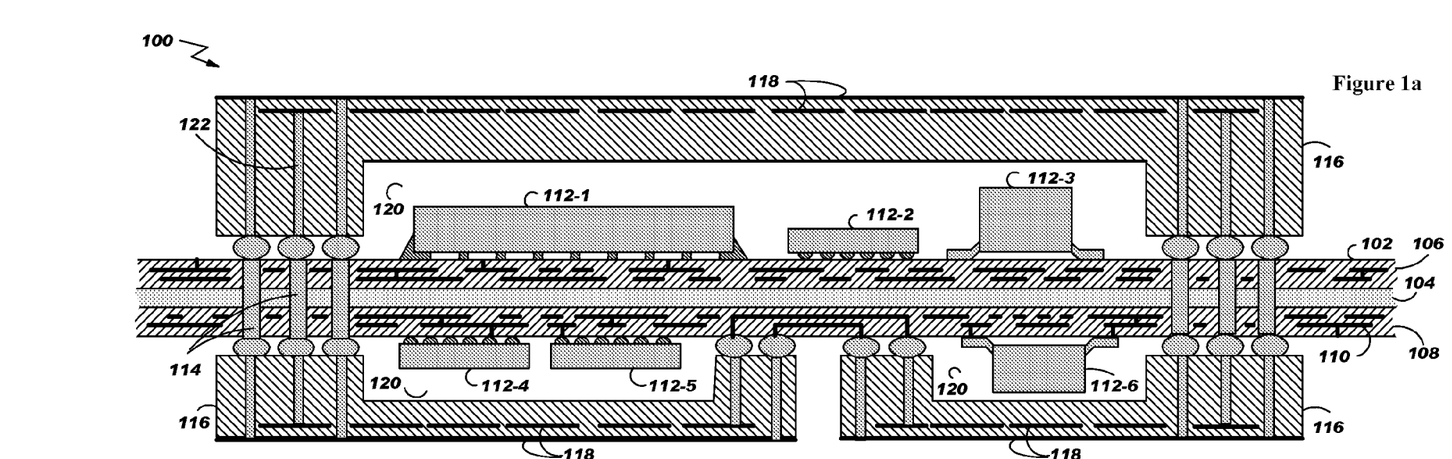
FIGS. 1a and 1b, is a cross-section view of an assembly comprising tamper-proof caps according to the invention according to a first embodiment.
Figure 1B:
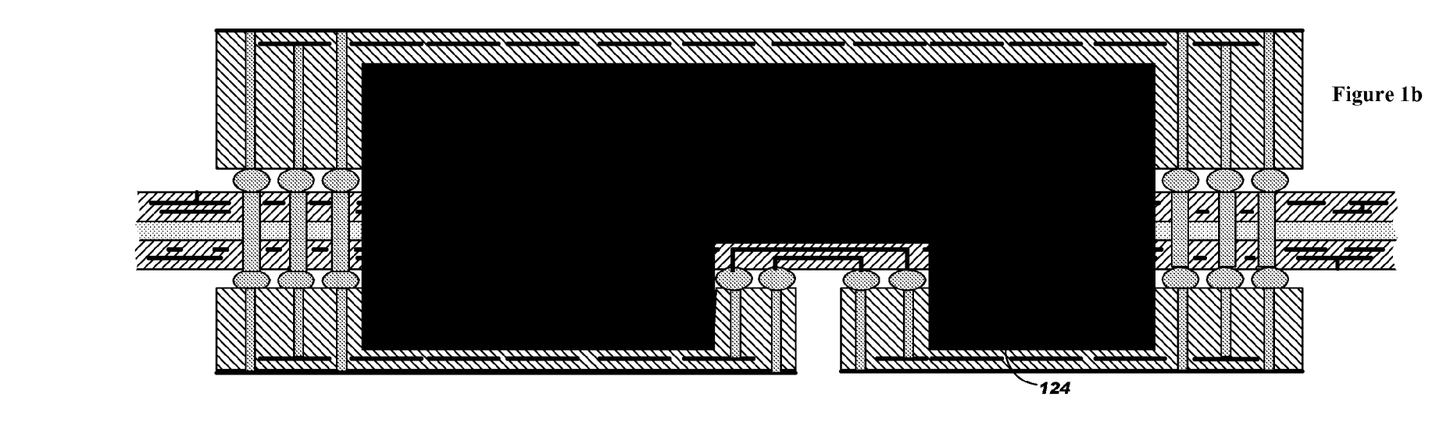

FIG. 1, comprising FIGS. 1a and 1b, illustrates an example of the system 100 of the invention. For sake of illustration, caps are mounted on both sides of the PCB, one side of the PCB being protected by two caps. As shown on FIG. 1a, the system 100 comprises a PCB 102 having a thin core laminate 104 and previously resin-impregnated fibers (also known as "pre-pregs") 106 and 108 mounted on each side of the core laminate 104. As depicted, conductive tracks (e.g. track 110) are embedded within the formed stack-up structure of the PCB 102 using standard PCB manufacturing process. The electronic devices 112-1 to 112-6 are soldered, or glued, on the PCB's surfaces, the electrical contact between the electronic devices and the PCB being done through pads according to standard techniques such Ball Grid Array (BGA), wire bonding or stud bumping. PCB 102 also comprises Plated Through Holes (PTH) or Resin Filled Plated through holes (RFP) or Resin Filled Holes (RFH) 114 disposed all around the PCB area to be protected, and arranged in such a way that a probe cannot be inserted in the PCB's thickness without creating a short or an open circuit. Plated Through holes are hollow holes drilled by mechanical or laser methods and then plated along their vertical walls, they generally are not filled with other materials but left empty. Resin filled holes are drilled by mechanical or laser methods and then plated along their vertical walls, they are filled with resin materials, sometime loaded with metals particles. Resin filled holes are drilled by mechanical or laser methods and then filled with a conductive paste without metallization by plating of the vertical walls. To streamline the overall geometries of the circuitry, all of the above ways of making conductive vertical holes may be of the land-less design. Land-less indicates that the large annular ring, normally present on the opposite sides of the laminate mating the drilled holes are removed by design, leaving only the portions connected to the inner walls materials and the electrical circuit trace present on the two surfaces of the PCB. As described below, these PTHs, RFPs or RFHs, generically referred to as conductive holes, cooperate with the caps so as to form the tamper-proof structure, or tamper-proof cavity.

Three caps, generically referred to as 116, having a similar structure, are mounted on PCB 102. Each cap consists in a PCB-like board embedding tamper-proof layers 118. A chamber 120 is formed in each cap for receiving electronic devices that must be protected, such that the electronic devices are enclosed within the chamber 120 between the PCB 102 and the cap 116 when the cap is in place. Caps 116 further comprise conductive holes 122 connected to the tamper-proof layers 118 as shown. When the caps are mounted on PCB 102, the conductive holes 122 are electrically connected to conductive holes 114 so as to form a tamper-proof space 124 as depicted on FIG. 1b.

Figure 2A:
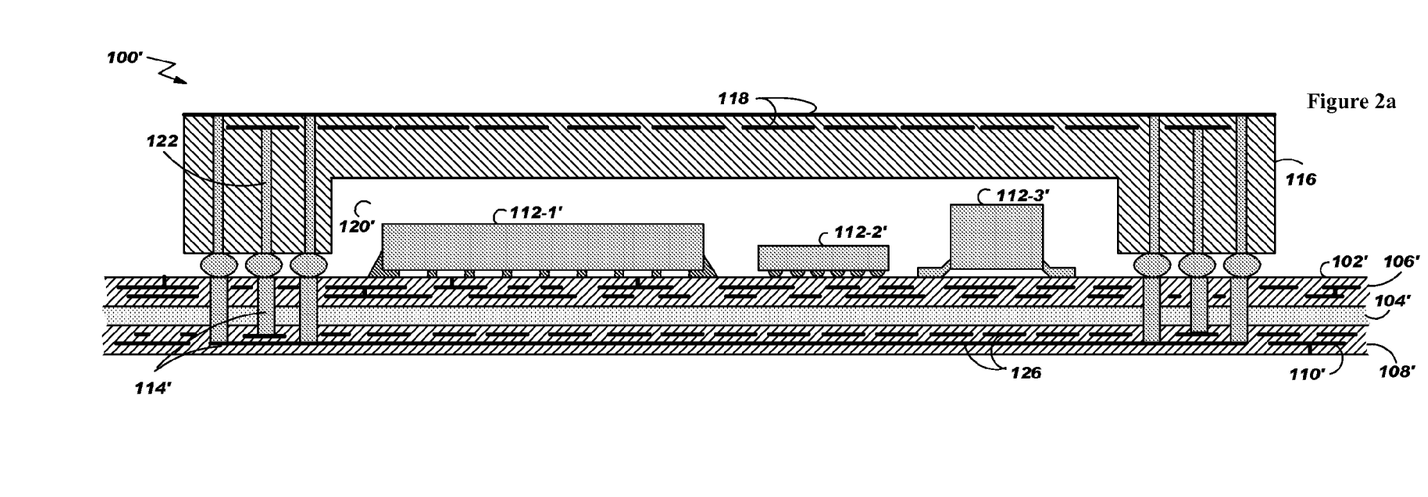
FIGS. 2a and 2b, is a cross-section view of an assembly comprising tamper-proof caps according to the invention according to a second embodiment.
Figure 2B:
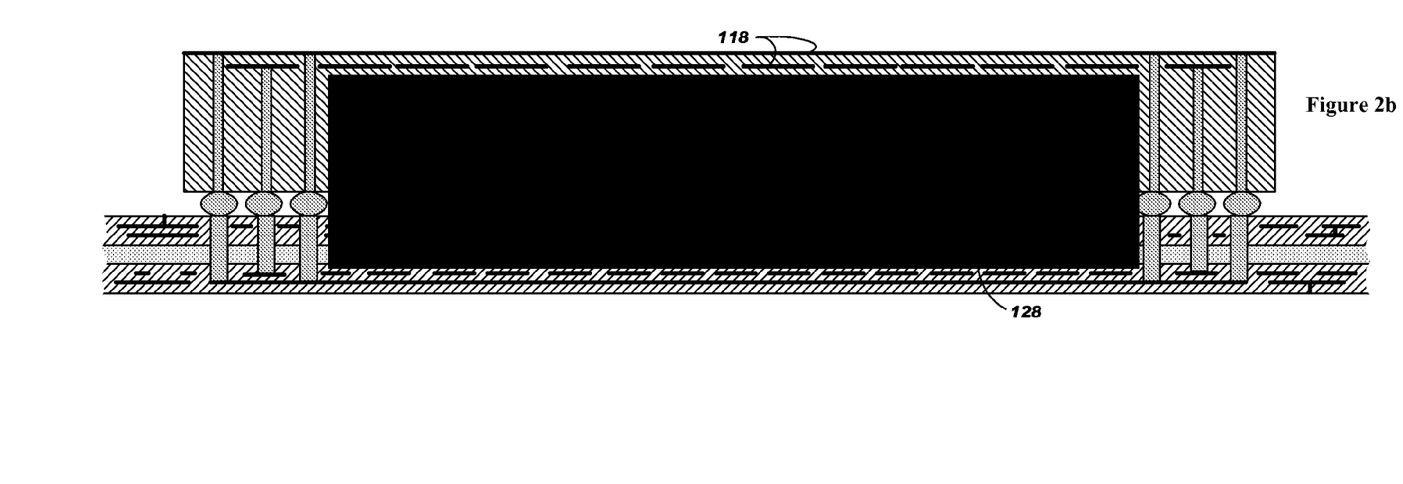

FIG. 2, comprising FIGS. 2a and 2b, illustrates a second embodiment of the invention wherein a single cap is used to protect one side of the PCB, the other side being protected by tamper-proof layers embedded within the PCB itself. As shown on FIG. 2a, the system 100' comprises a PCB 102' having a thin core laminate 104' and pre-pregs 106' and 108' mounted on each side of the core laminate 104', like PCB 102 of FIG. 1. Likewise, as depicted, conductive tracks such as track 110', are embedded within the formed stack-up structure of the PCB 102' and the electronic devices 112-1' to 112-3' are soldered, or glued, on the PCB's surfaces, the electrical contact between the electronic devices and the PCB being done through pads according to standard techniques such as BGA or wire bonding. PCB 102' comprises conductive holes 114' disposed all around the PCB area to be protected, arranged in such a way that a probe can not inserted in the PCB's thickness without creating a short or an open circuit. PCB 102' also comprises tamper-proof tracks 126 electrically connected to conductive holes 114', forming a tamper-proof structure similar to the one of a cap. As described below, the conductive holes 114' cooperate with the cap 116 and the tamper-proof tracks 118, 126 so as to form the tamper-proof space 128 illustrated on FIG. 2b.

Tamper-Proof Cap Structure

FIG. 3 depicts the tamper-proof structure of the cap according to the invention. FIG. 3a is a cross-section view of the PCB 102 and of two caps, referred to as 116-1 and 116-2, adapted to be mounted on each side of PCB 102. As described above, caps 116-1 and 116-2 comprise conductive holes 122 that are connected to conductive tracks 118. The electrical connection between conductive holes 122 and conductive tracks 118 is such that, when the caps are positioned on the PCB 102, the conductive path so formed is a simple path wherein an open can be easily detected, as illustrated with arrows representing current.

Figure 3A:
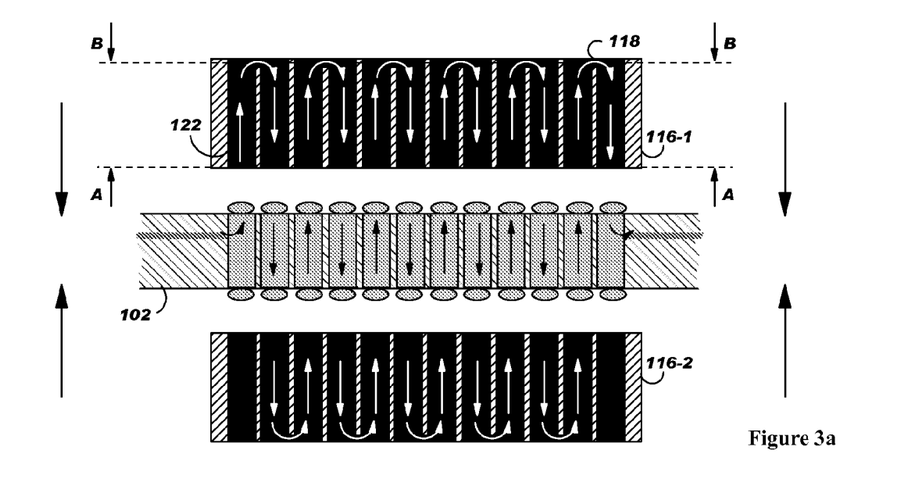
FIGS. 3a, 3b, 3c, and 3d, depicts the tamper-proof layers of a tamper-proof cap.
Figure 3B:
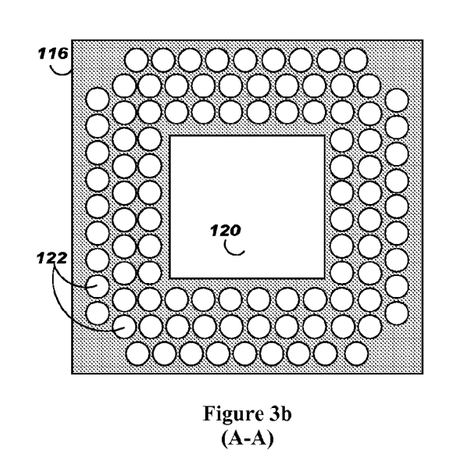

FIG. 3b illustrates the preferred disposition of the conductive holes 122, and consequently of the conductive holes 114, of the cap 116. FIG. 3b is a bottom view of the cap 116 according to line A-A of FIG. 3a. According to this arrangement, a probe can not be inserted in the tamper-proof space without creating a short or an open circuit. In a preferred embodiment, the conductive holes 122 are disposed on a row comprising three adjacent ranks of conductive holes such that the conductive holes of two adjacent ranks are aligned and the conductive holes of the third adjacent rank is offset from the other two adjacent ranks by a distance that is half the distance between two adjacent conductive holes, as depicted.

It should be understood that any other arrangement preventing a probe to be inserted from outside to the internal chamber 120 of the cap tamper-proof structure without creating a short or an open circuit can be used. In particular, more or less than three ranks of conductive holes and of micro-BGA can be used. The number and the disposition of the conductive holes and of the micro-BGA as well as the size of the micro-BGA determine the security level of the package. As a general rule, the security level of the package increases with the number of micro-BGA and conductive holes, and with the number of ranks of micro-BGA and conductive holes, while the smaller the micro-BGA are, the higher is the security level. A high security level means that it is almost impossible to introduce a probe between conductive holes or micro-BGA without creating a short or an open circuit. It should be noticed that each rank is preferably similar to the one shown on FIG. 3a so that a short between two adjacent ranks e.g., a short created when inserting a probe, can be easily detected.

Figure 3C:
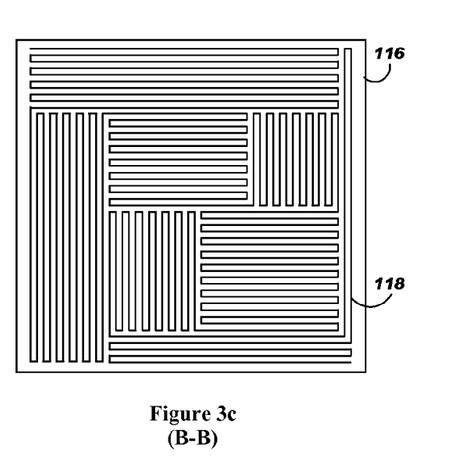

The tamper-proof layers of the caps comprise at least two conductive tracks belonging to two different conductive layers so that a short between the two conductive tracks or an open in one of the conductive tracks can be detected. Improvements in the security level are obtained in creating a non predictable pattern of the secure tamper layer, such as even if a localized analysis is done it cannot effectively predict the pattern in a nearby area as well. This is accomplished by the adoption of changes in direction of the line pattern deviating from repetitive and constant pattern configurations. Two close by lines are part of the same net but in very distant position from the resistive value, as illustrated on FIG. 3c. FIG. 3c is a plan view of the cap 116 according to line B-B of FIG. 3a.

Figure 3D:
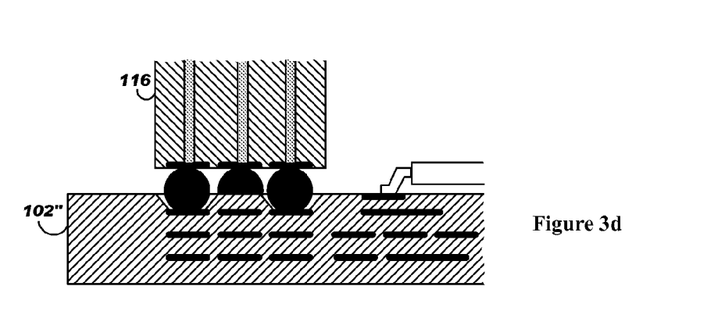

As illustrated on FIGS. 1 and 2, the caps are preferably soldered to PCB using micro-BGA so that chambers 120 and 120' are open chambers allowing air exchange between chambers and the system environment. Micro-BGA can be soldered to pads that are not residing in the outermost metal layer of the printed circuit board. This can be achieved by soldering micro-BGA to pads of metal exposed by openings into the dielectric made with laser operations, controlled depth mechanical drill or photolitographic processes. Such an embodiment still leaves at the end an air gap between the parts but moreover, greatly reduces the height and exposure of the solder connections in free air. FIG. 3d illustrates an example of such micro-BGA arrangement using cavities. As shown, the PBC 102" comprises cavities adapted to receive micro-BGA, the bottom of the cavities corresponding to an internal conductive layer of the PCB e.g., the first internal conductive layer. Naturally, the cavities can be done in the PCB 102", in the cap 116, or in both of them. It is also possible to use micro-BGA of different sizes in conjunction with cavities of different depths for establishing electrical contacts with different conductive layers of the PCB or of the cap especially when thin dielectric layers in the order of few tens of microns, such as the one used into build up technologies, are used. This increases the level of difficulties in being considered for lateral attack with microprobes. The remaining gap height is much smaller than the diameter of the thin probes. Furthermore some electrical circuit lines on the very outermost metal layer can be placed along the periphery of the micro-BGA attachment area to limit the ability to access to the secured area using drilling of lateral holes/trenches with the intent of creating a semi-buried path for the probe within the construction of the PCB or Cap, through the array of micro-BGA. Security requirements are also met forcing the tampering attempt not to have linear paths, the making of barriers with different heights and/or depths will force the possible probing technology to dive and rise and then bend in different directions to by-pass the different layer of anti-tamper structures, a 2 bends of 90° are considered as a sufficient condition to disabling active probing within the secured area. Such complex paths makes it extremely difficult to drive a probe into the secured environment so as to freely travel probing the different components into the secured area. In a further extension of the previous embodiment the way the different micro-BGA are sequenced may be tailored in such a way that the next neighbor micro-sphere to one in a specific position is not the one in direct sequence from the electrical (high resistive) circuit point of view. In such way a shunt between two neighboring micro-BGA's will significantly alter the electrical resistive values monitored by the secure anti-tamper electronic circuit. Air exchange is a key feature of the assembly in that it reduces problems like moisture and air thermal expansion that could lead to tears and breaks.

Manufacturing of Tamper-Proof Caps

Figure 4A:
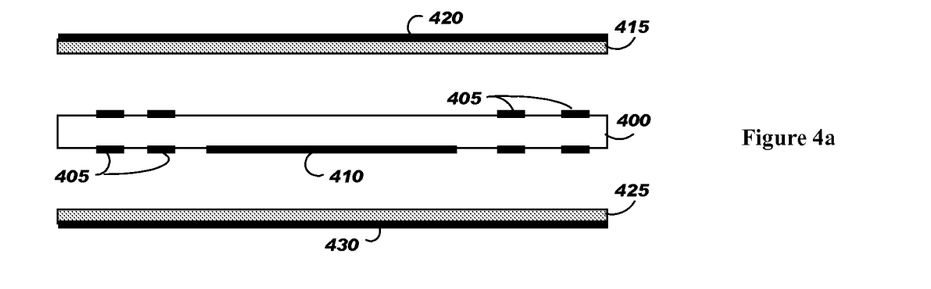
Figure 4B:
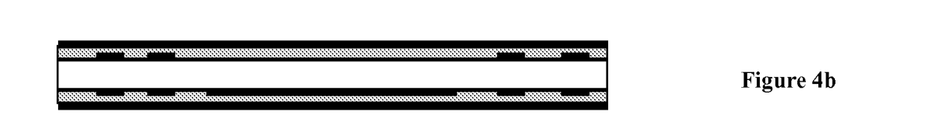

The manufacturing of the tamper-proof caps according to the invention is similar to the one of standard PCB even if it comprises a further step consisting mainly in forming the tamper-proof chamber. FIGS. 4a to 4f illustrate an example of the main steps of manufacturing the tamper-proof cap 116. As depicted on FIG. 4a, a core 400 on which conductive tracks 405 are designed is sandwiched between two pre-pregs, each comprising a dielectric layer 415 and 425, and a conductive layer 420 and 430. In a preferred embodiment, one side of the core 400 comprises a conductive surface 410 of size that is approximately the one of the top of the chamber, for the purpose of electromagnetic shielding. FIG. 4b illustrates the assembling of core 400 with pre-pregs comprising dielectric layers 415 and 425, and conductive layers 420 and 430.

Figure 4C:
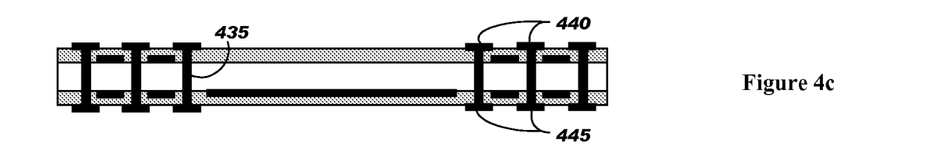

Once assembled, conductive holes 435 are formed to provide a tamper-proof structure as discussed by reference to FIGS. 3a and 3b. Then, conductive tracks 440 and 445 are formed on the surfaces by etching conductive layers 420 and 430, as shown on FIG. 4c. The conductive tracks designed on the same side as the one wherein shielding surface has been created (or may have been created) form a tamper-proof layer having characteristics that are preferably the ones described by reference to FIG. 3c.

Figure 4D:
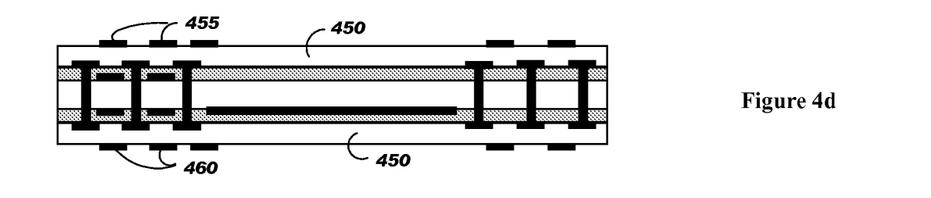

As shown on FIG. 4d, a dielectric layer 450 is then deposited on each of the conductive layers 420 and 430 and conductive tracks 455 and 460 are formed by depositing conductive material. Some of the conductive tracks 455 are electrically connected to the conductive holes 435 so that an electrical connection can be done between a PCB and the tamper-proof structure when the cap is mounted on the PCB. The conductive tracks 460 designed on the same side as the conductive tracks 445 form a second tamper-proof layer having characteristics that are preferably the ones described by reference to FIG. 3c.

Figure 4E:
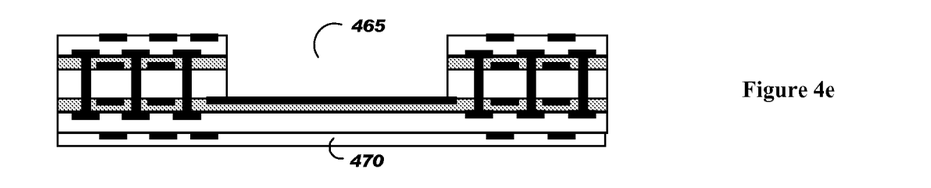

Then, the chamber 465 is formed e.g., using a drill or a reamer, in the cap as depicted on FIG. 4e, and a dielectric layer 470 is deposited on conductive tracks 460.

Figure 4F:
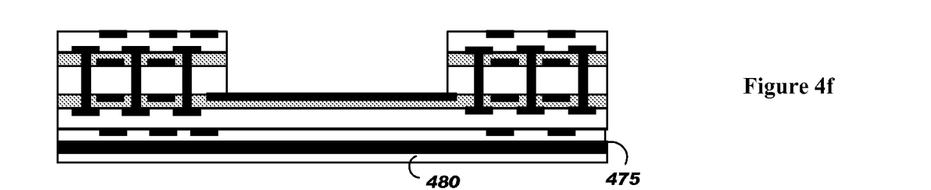

Still another improvement consists in applying a shielding layer 475 on top of the tamper-proof layers i.e., on top of dielectric layer 470, thus avoiding any non destructive analysis of the cap e.g., X-ray analysis, as shown on FIG. 4f. Such a shielding layer can be, for example, a plated copper layer. Conductive layer 475 is preferably protected by a dielectric layer 480.

Use of Conductive Ink for Tamper-Proof Cap Layers

To optimize tamper-proof structure, conductive ink can be used to design conductive tracks 445 and 460 of the tamper-proof layers. According to this embodiment a conductive ink, preferably a conductive polymeric ink, is placed into a precise pattern embedded into the cap.

Still in a preferred embodiment the cap is built in respect of symmetry to control mechanical behaviors like induced warpage from differential PCB materials shrinkage (metal, glass, plastic) because these thermo-mechanical strains and deformations are exacerbated when a non symmetrical multilayer construction is used. This problem is true also for recently developed technologies where layers are added on a rigid core, that can be a multilayer substrate, made of classical stack up of woven glass cloths impregnated with resins and copper sheets etched with circuit patterns. The reinforced or non-reinforced cores and may include an epoxy, polyester, cyanate ester, bismaleimide triazine, poly-phenilene eter, annylated poly-phenilene eter, polynorborene, liquid crystal polymer (LCP), Teflon, polyimide or resinous material, and mixture thereof, as is conventionally known.

In recent years and under a strong pressure to achieve miniaturization, the PCB technology has evolved in adding layers using a photolithographic technique also for the dielectric layers where the dielectric is made of pure resin and no glass fibers are present. With the implementation of these added layers, referred to in the industry as Build-up layers, a new approach for copper plating process, with a much greater definition capability, has been taking place replacing the most commonly used subtractive process. The difference is consistent with the naming, where "Subtractive" basically removes copper wherever it is not needed starting from a full plated panel by a photolithographic process of a protecting mask. This process is not capable of defining very small geometries. The resulting conductor trace shape has a trapezoidal connotation, with a larger base than the top side of the conductor.

The newly adopted additive plating basically represents the opposite approach, wherein the path here is to add copper only where is needed. To do so a temporary plating mask is obtained by photolithography on the panels and then, thanks to the presence of a colloidal seeding layer in these areas, copper is plated only into the open spaces. The main steps of such process are, colloidal seeding deposition;
mask material deposition;
mask definition by photolithography;
plating of copper in the trenches;
removal (stripping) of the plating mask;
removal of the colloidal (flash-etch) being exposed from the mask removal; and,
deposition of the new dielectric material covering the traces and preparing a flat surface for the generation of a new wiring layer.

According to the preferred embodiment it is possible to plate copper on one side of the laminate while screen printing the conductive inks on the opposite side. In this embodiment, the same polymer pattern created for copper plating is then used as a mask to receive the conductive ink.

Still in a further embodiment, on the ink side of the carrier, a different polymer can also be used, this material has to be compatible with the cap base material and related processes would not require to be removed/stripped and can be left on board becoming integrated within the board construction.

Typical conductive ink formulation contains a thermosetting binder resin system such as epoxy resin or a blend of resins, a cross-linking agent such as methoxymethylamine, a catalyst such as an acid, a particle filler that may defines electrical/thermal/optical properties of the ink and an organic solvent. Formulations are also addressing desired properties that the conductive ink should provide such as: good rheology for screen printability and stability at relatively high temperatures on the substrate, so that it is not affected by any heat treatment which may be necessary in the manufacturing cycle. Optional ingredients like flow additives, adhesion promoters, and rheology modifiers may be included. Filler compounds which are commonly in the form of a thin powder or in particles/flakes once dispersed in the resin remain an integral part of the final composition after processing. The binder which serves as carrier for the filler particles generally consist of epoxy resin, some other currently available conductive inks also contain a phenolic resin or a mixture of resins such as acetyl-acetone with cyanic acid ester resin or acrylic resin with melamine resin or epoxy and urethane mixture.

There are also inks formulated with the usage of different binders like the ones using thermoplastic resins such as polyester adhesives, acrylic thermoplastics like methyl acrylate or methyl metacrylate resins, poly-vinyl-chloride (PVC), fluoroelastomers or cellulosic binders. Each one of these different binders is effectively addressing specific needs but may have other limitations, for example in terms of maximum operating temperature.

The selection of the fillers is defined by the level of required electrical conductivity, i.e. resistance per linear unit of a trace, needed for the application. Filler can be mono-component or mixtures of more different materials and they may comprise metals, metal oxides or alloys, such as: silver, copper, copper-oxide, gold, silver coated copper, silver coated aluminum, NiP, Ni Cr. NiCrAlSi, or other prepared materials such as metal coated mica or lead borosilicate crystalline glass or aluminum borosilicate crystalline glass powder/spheres, and compounds like carbon, graphite, or a mixture thereof.

Figure 5:
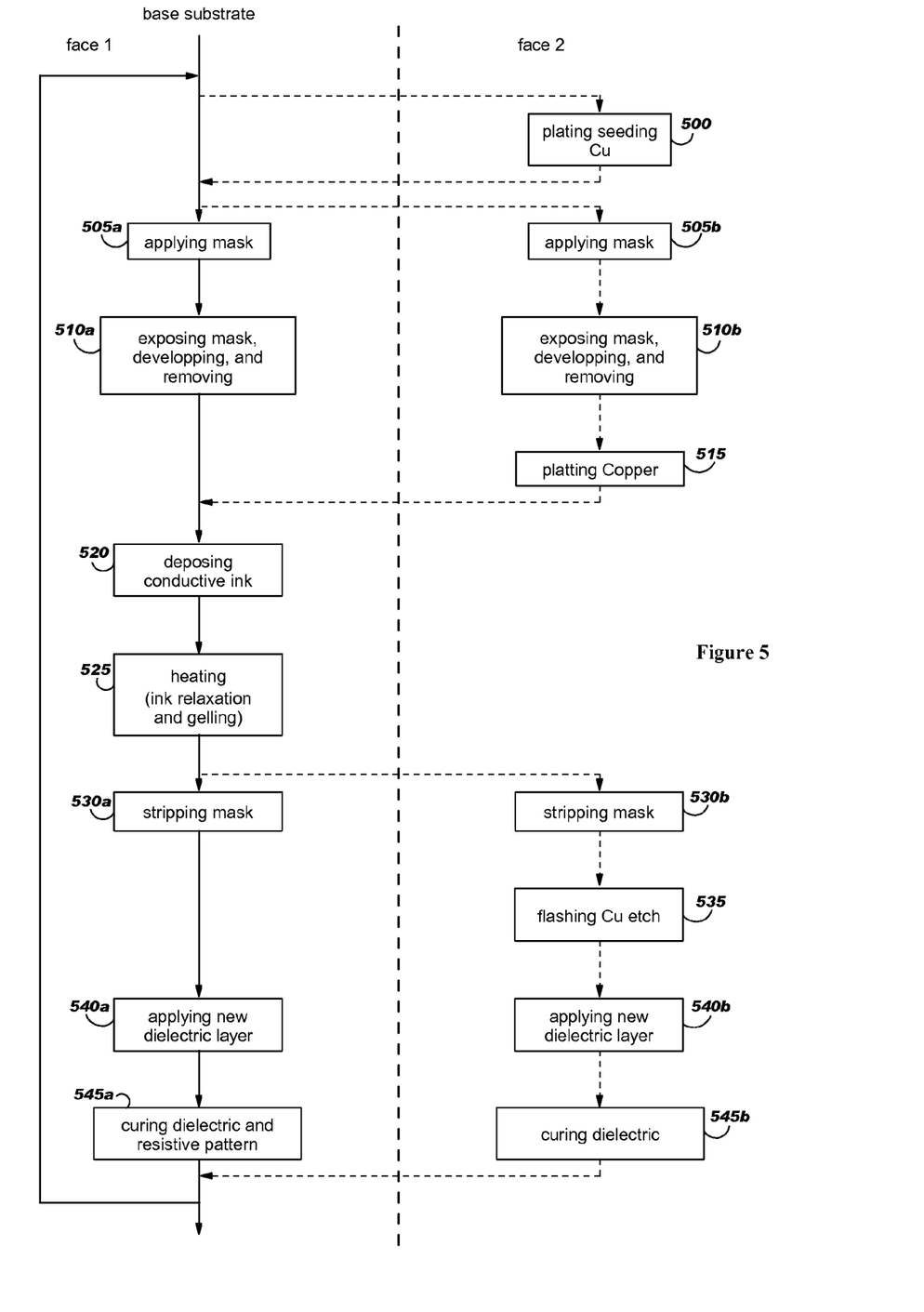
FIG. 5 depicts the main steps of the algorithm for screen printing the conductive ink in order to form the tamper-proof layers according to a preferred embodiment.

Now turning to FIG. 5, here are illustrated the main steps of the algorithm for screen printing the conductive ink in order to form the tamper-proof layers. For sake of illustration, the left part of the drawing concerns the module laminate stack-up face wherein the conductive ink is deposited, referred to as face 1, while the right part illustrates the steps that can be optionally performed on the other face, referred to as face 2, to design conductive tracks e.g., copper tracks. Starting from a base substrate, a colloidal seeding copper layer can be plated on face 2 if conductive tracks have to be designed on this face (step 500). Then, a plating mask is applied on face 1 (step 505a), exposed, developed, and partially removed (step 510a) so as to create a negative print of the surface where conductive ink must be deposited. The same can be simultaneously applied on face 2 (steps 505b and 510b), if required. In such case, copper is plated on colloidal seeding copper layer where plating mask has been removed (step 515). Conductive ink is then deposed on face 1 where plating mask has been removed (step 520). In a preferred embodiment, conductive ink is deposed as thick liquid or cream on face 1, the ink being spread on the base substrate so as to fill the gap left by the removed plating mask. Still in a preferred embodiment, the conductive polymeric ink is heated up to facilitate the material flow and then to a higher temperature or for a preset time to start gelling or polymerization (step 525).

After having deposed conductive ink and plated copper, if required, the plating mask is stripped, or removed, (steps 530a and 530b). Preferably, the plated copper is flash-etched (step 535). Then the conductive ink and tracks are protected by applying a new dielectric layer on each face (steps 540a and 540b), or only on face 1 if not any conductive track has been designed on face 2. Finally, dielectric and resistive patterns are cured for completing polymerization of conductive ink and newly added dielectric layers prior to proceed to the generation, addition, of new layers. (step 545a and 545b). As illustrated, steps 500 to 545a and 545b can be repeated to stack several tamper-proof layers and/or conductive layers.

FIGS. 6a to 6m illustrate the main steps of the algorithm depicted on FIG. 5.

Figure 6A:
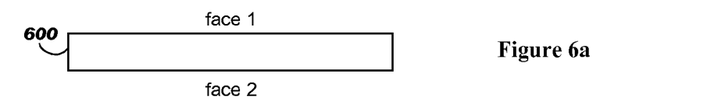

FIG. 6a depicts the base substrate 600 with its upper face, referred to as face 1, wherein the conductive ink is deposed and its lower face, referred to as face 2, wherein conductive tracks are optionally designed.

Figure 6B:
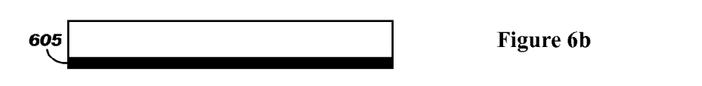

FIG. 6b illustrates the base substrate 600 when a the colloidal seeding copper layer 605 has been plated on face 2, according to step 500.

Figure 6C:
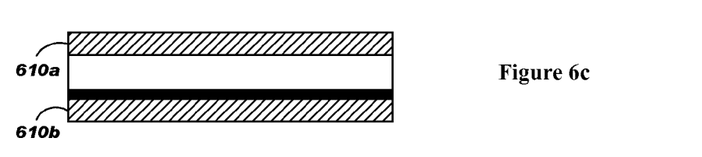

FIG. 6c shows the base substrate 600 where faces 1 and 2 are covered with plating masks 610a and 610b, according to steps 505a and 505b, respectively.

Figure 6D:
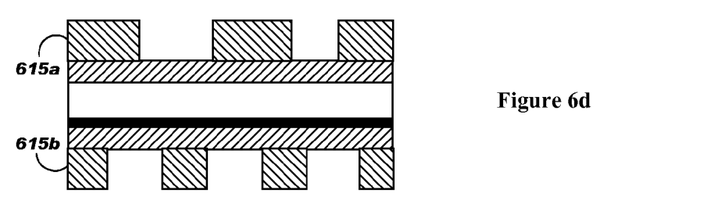
Figure 6E:
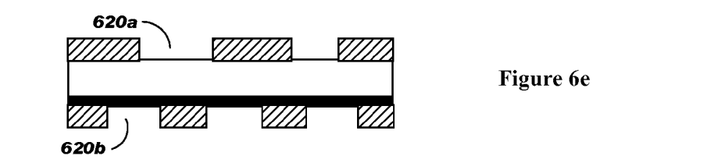

FIGS. 6d and 6e illustrate the deposit of photoresist material layers 615a and 615b, their developing and plating mask striping, corresponding to steps 510a and 510b. At the end of these steps, the plating masks 610a and 610b are partially removed so as to create holes 620a and 620b wherein conductive material must be deposited.

Figure 6F:
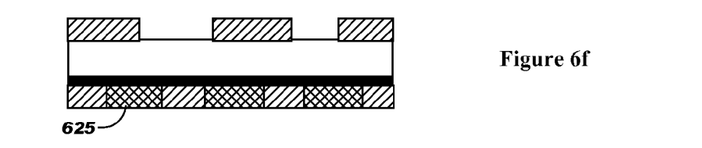

FIG. 6f depicts the base substrate 600 after copper tracks 625 have been plated on colloidal seeding copper layer 605 where plating mask has been removed, according to step 515.

Figure 6G:
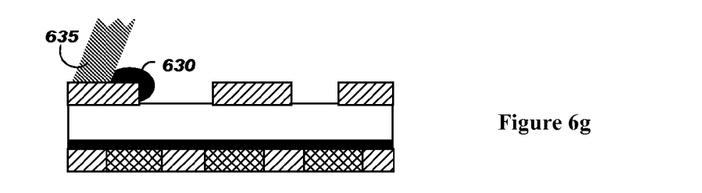
Figure 6H:
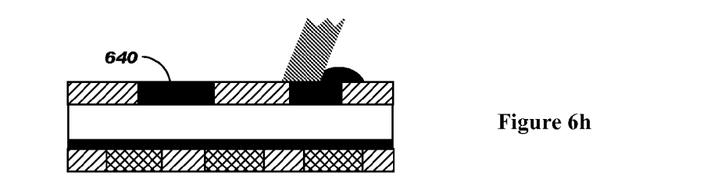

FIGS. 6g and 6h show how conductive ink 630 is spread on face 1 of base substrate 600 according to step 520. In the preferred embodiment, conductive ink 630 is deposed as paste, allowing a squeegee 635 to spread it on the surface so as to fill the gaps left by the removed mask and to create conductive paths 640.

Paste must be understood here in its general meaning i.e., a material that state is somewhere between liquid and solid. As a consequence, ink paste can have different viscosity and flow properties, from almost a liquid form (viscosity at 20° C. 1,400 mPa·s or lower) up to viscous ones (>100.000 mPa·s), the selection of ink viscosity is mostly driven by the deposition technique. The preferred embodiment uses a screen printing technique with material having viscosity comprised in the range 1000 to 20.000 mPa·s.

Still according to the preferred embodiment, conductive inks are made by mixing a resin matrix with fillers made of particles that, being electrically conductive or not conductive, define the ink properties. Resins can be classified in respect of their "plastic" behavior, i.e. thermoplastics versus thermosets, or based on their molecular weight, chemistry (i.e. Vinyl, Polyurethane, Acrylic, Cellulosic) and so on.

Fillers can be carbon based using graphite powder, carbon powder, or of metal nature with metal oxides, ceramic powders and so on. All fillers can be mixed to achieve specific electrical values.

Also colors for the ink can be tailored to the specific need using appropriate dyes, black, blue, and green are commonly available colors. The color is an important factor in making the detection of the protecting secure structures difficult. If the different materials have the same color, it becomes more difficult to appreciate where is and how is placed the protective pattern. A black on black offers a very limited transparency in the visible light analysis but also other possible hues of blue and green are possible.

In the specific embodiment the selected ink is an epoxy based material with graphite powder as filler. The epoxy-graphite ink is not detectable by X-rays analysis neither using transmission or laminography techniques.

The epoxy selection for the ink binder is mainly to meet the material properties of the standard dielectric of the laminate substrate that is an epoxy compound. The same solder mask that can also be used as a protective agent of the conductive ink is preferably, in the selected PCB technology, an epoxy.

Figure 6I:
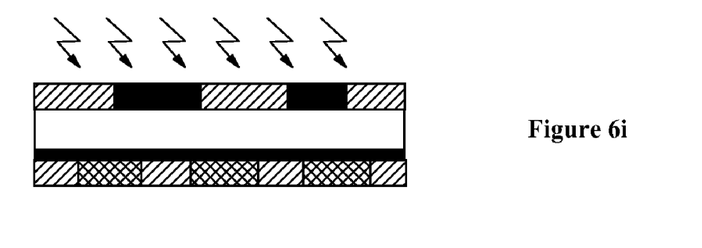

FIG. 6i illustrates the step 525 consisting in heating the conductive ink for facilitating the material flow and then starting gelling or polymerization.

As mentioned above, once screened into the trenches, the ink is brought to a higher temperature to facilitate the material flow, which fills the possible gaps left over from the screen printing operation. This "Flow time" also allows the material to become uniform in the distribution over the laminate filling correctly the channels. This flow helps then in obtaining a uniform thickness along the deposited pattern, for example reaching the required 15 µm targeted for this kind of application, compatible with the symmetry in the laminate with the opposite homologous copper plated layer.

The temperature rise, if protracted for a longer time will drive the material to transit from a flowing phase to a start of polymerization, this is a status known as "Gelling" where the flow properties are becoming significantly reduced until they stop completely. If this temperature cycle is then further incremented the real cross linking phase for the material starts, and the material freeze in its flow and shape properties.

Figure 6J:
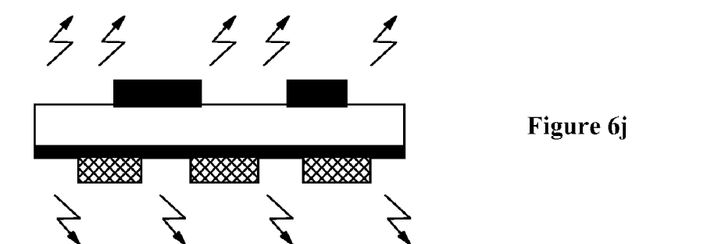

FIG. 6j depicts the stripping of plating masks 610a and 610b, according to steps 530a and 530b, leaving behind the deposited conductive ink and conductive track patterns. With the stripping of the mask the excess and/or the misplaced ink is removed, obtaining a uniform definition of the resistive pattern, similarly to what are the conductive tracks e.g., copper traces in this example, on the opposite side of the substrate.

Figure 6K:
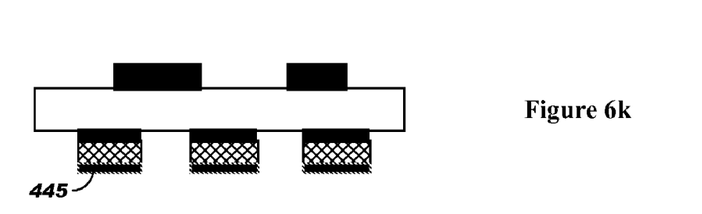

FIG. 6k shows the flash-etched plated copper 445 corresponding to step 535.

Figure 6L:
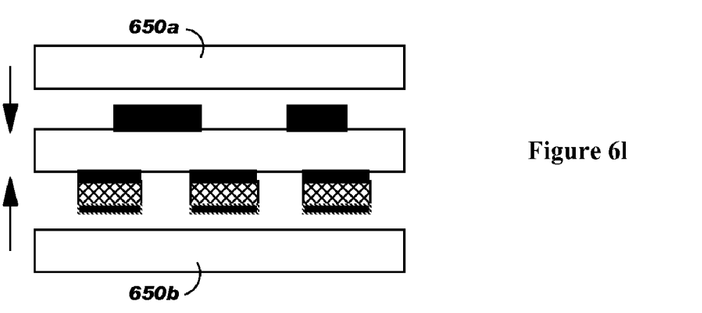

FIG. 6l illustrates the steps 540a and 540b consisting in applying new dielectric layers 650a and 650b on both faces of the base substrate 600 so as to protect conductive ink paths 640 and conductive tracks 445. This dielectric is of the same nature of the ink, i.e. achieving an epoxy on epoxy combination or other inks/dielectric combinations using similar chemistries. The dielectric deposition is performed on both sides of the laminate structure, covering copper traces on one side and the ink pattern on the other side.

Figure 6M:
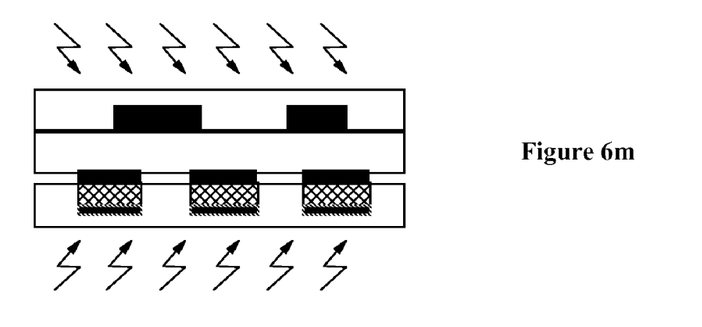

FIG. 6m illustrates the steps 545a and 545b. Once the new dielectric is deposited the material undergoes a polymerization cycle that achieves branching between the polymer chains of the two materials (ink and dielectric) reaching a stronger level of adhesion between the two. This level of molecular inter-diffusion and grafting during the polymerization cycle makes the selective removal of one of the two materials very difficult to be performed.

Similarly an activation of the gelled or even cured polymer surface by an activator that chemically reverts the surface to accept grafting from the newly deposited dielectric material is also a known technique to achieve a strong polymer to polymer adhesion.

Beyond surface activators that promote reactions in the polymers there are also adhesion promoters, like diblock copolymers that can bridge, by the presence of different blocks of repeated units capable to selectively react with one of the two, or more, resins present in the interface.

A further development would be to use a non wettable polymer by the ink to create the mask that can be left over on the laminate after ink deposition and cleaning of the surplus ink material.

With the deposition of the new dielectric layer a full embedding of the resistive network is obtained and with the similar chemical properties of the two materials, it becomes difficult to selectively attack one of them without attacking the other.

A further embodiment of this secure layer construction is using a different overall approach, where the secure matrix is built using colloidal graphite dispersion in a solvent (isopropanol, water) solution. This material quickly air dries. The final deposit thickness is in the order of few microns that make the network very difficult to be tampered, especially once it gets mechanically embedded (protected) by layers of dielectric materials, i.e. epoxy resins.

Specific Tamper-Proof Caps

The caps according to the invention can be adapted to handle particular cases. For example, tamper-proof caps may comprise conductive path and room for receiving electronic devices that can be soldered or glued so that active or passive electronic devices are embedded within tamper-proof caps. Likewise, the tamper-proof structure of the cap can be located in a portion of the cap.

Figure 7:
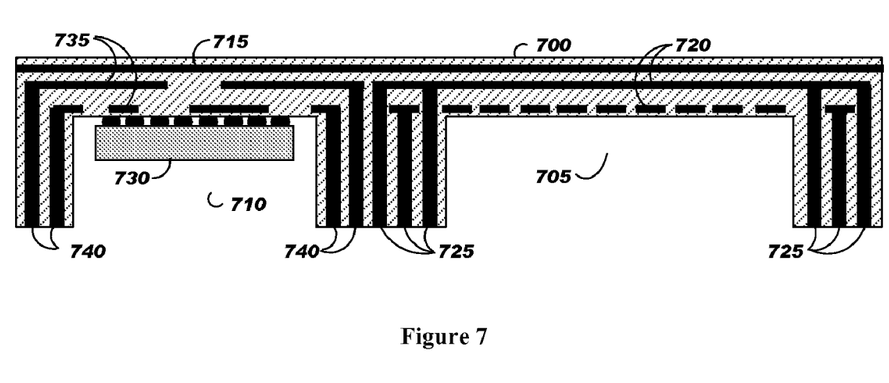
FIG. 7 illustrates an example of a specific cap comprising two chambers: a tamper-proof chamber and a chamber wherein electronic device can be connected.

FIG. 7 illustrates a specific cap 700 comprising two chambers: a tamper-proof chamber 705 and a chamber 710 wherein electronic devices can be connected to the cap. Cap 700 comprises a shielding layer 715 covering the whole cap and two tamper-proof layers referred to as 720 designed on top of the tamper-proof chamber 705. Cap 700 further comprises conductive holes or vias 725 forming a part of the tamper-proof structure of chamber 705 and adapted to connect tamper-proof layers 720 to the PCB on which the cap is mounted. In this example, an electronic device 730 is mounted in chamber 710 using BGA. Electrical connection between electronic device 730 and the PCB on which the cap is mounted is done through conductive tracks 735 and conductive holes or vias 740.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for manufacturing a tamper-proof cap from a printed circuit board, said method comprising the steps of:
    forming a plurality of conductive tracks in at least two stacked conductive layers on a first side of said printed circuit board, said at least two conductive layers being insulated each other with dielectric material;
    forming conductive holes in said printed circuit board for providing electrical connection to said plurality of conductive tracks from the second side of said printed circuit board layers stack, said conductive holes and said plurality of conductive tracks forming a tamper-proof layer, whereby one of a short circuit between the conductive tracks and an open circuit in one of the conductive tracks can be detected; and
    forming a cavity in said second side of said printed circuit board, said cavity being surrounded by said conductive tracks and said conductive holes.

2. The method of claim 1 further comprising forming metal pads connected to said conductive holes.

3. The method of claim 1 wherein said conductive tracks are formed with conductive ink or metal oxides.

4. The method of claim 1 further comprising the steps of:
   depositing a dielectric material on top of said at least two conductive layers; and
   forming a conductive layer on top of said deposited dielectric material.

5. The method of claim 1 further comprising the step of forming a conductive surface on said printed circuit board, between said printed circuit board and said at least two conductive layers, said conductive surface being insulated from said at least two conductive layers, to form an electromagnetic shield.

* * * * *